428-408 SR
7/25/78 XR 4,103,066

United States Patent [19]

Brooks et al.

[11] 4,103,066

[45] Jul. 25, 1978

[54] POLYCARBONATE RIBBON FOR NON-IMPACT PRINTING

[75] Inventors: Gary Fred Brooks, San Jose; Walter Crooks; William Joseph Weiche, both of Los Gatos, all of Calif.

[73] Assignee: International Business Machines Corporation, Armonk, N.Y.

[21] Appl. No.: 842,652

[22] Filed: Oct. 17, 1977

[51] Int. Cl.$^2$ .................................................. B32B 9/04

[52] U.S. Cl. .................................... 428/337; 428/408; 428/411; 428/412; 428/484; 428/538; 400/118

[58] Field of Search ............... 428/408, 411, 334, 337, 428/484, 412, 220, 538; 197/1 R

[56] References Cited

U.S. PATENT DOCUMENTS

| | | | |
|---|---|---|---|
| 3,582,398 | 6/1971 | Ringler | 428/412 |
| 4,022,944 | 5/1977 | Bottenbruch | 428/412 |

*Primary Examiner*—Marion E. McCamish
*Attorney, Agent, or Firm*—Joseph G. Walsh

[57] ABSTRACT

The present invention is concerned with a ribbon for non-impact printing. The ribbon comprises a transfer coating and a substrate which is a polycarbonate resin containing from about 15% to about 40% by weight of electrically conductive carbon black.

6 Claims, No Drawings

POLYCARBONATE RIBBON FOR NON-IMPACT PRINTING

Field of the Invention

The present invention is concerned with a ribbon for use in non-impact printing. In particular, it is concerned with a resistive ribbon for use in a process in which printing is achieved by transfering ink from a ribbon to paper by means of local heating of the ribbons. Localized heating may be obtained, for example, by contacting the ribbon with point electrodes and a broad area contact electrode. The high current densities in the neighborhood of the point electrodes during an applied voltage pulse produce intense local heating which causes transfer of ink from the ribbon to a paper in contact with the ribbon.

Prior Art

Non-impact printing is known in the prior art. See for example, U.S. Pat. Nos. 2,713,822 and 3,744,611. This latter patent describes a non-impact printing process employing a ribbon containing a transfer coating and a substrate. The patent mentions the use of conductive carbon black in the substrate but is entirely devoid of any teaching in regard to the use of polycarbonate resin.

There are many other teachings of the use of carbon black as an electrically conductive material. See for example, U.S. Pat. Nos. 3,908,064 and 3,962,513, both of which deal with the use of carbon particles. These patents, however are again totally devoid of any teaching in regard to polycarbonate

Summary of the Invention

The present invention provides a ribbon for use in non-impact printing. The ribbon comprises a transfer coating and a substrate which is polycarbonate resin containing from about 15% to about 40% by weight of electrically conductive carbon black.

For use in thermal non-impact printing, a ribbon must simultaneously possess several qualities. It is extremely difficult to find materials which impart these properties simultaneously to a ribbon. The present invention provides a substrate which does confer these properties. In particular, the substrate imparts to the ribbon the ability to disperse the carbon uniformly therein. Secondly, it provides the desired degree of electrical resistivity. Finally, although the ribbon may be made by other methods, it is particularly suitable for manufacturing by a delamination process in which it maintains its film integrity. Many combinations of resin and electrically conductive additives were tested, but the polycarbonate resin, carbon black additive of the present invention was the only one to give satisfactory results simultaneously in all three respects discussed immediately above.

The prior art teaches many variations in the possible transfer coating for non-impact printing. A typical transfer coating comprises a wax, carbon and a dye. The transfer coating is generally from about 1 to about 5 microns thick. The substrate of the present invention is suitable for use with any conventional transfer coating.

The substrate of the present invention is made of a polycarbonate resin containing from about 15% to about 40% by weight of conductive carbon black. About 30% by weight is preferred. When the concentration of carbon is above about 40% carbon by weight, the film loses its integrity. On the other hand, when the concentration of carbon black is below about 15% , electrical conductivity becomes too low.

Polycarbonate resin is a staple article of commerce and is available commercially from several manufacturing sources. For example, it is available from General Electric Company under the trademark "Lexan" and from Mobay Corp. under the trademark "Merlon."

Carbon black is available from numerous commercial sources. For the present invention, furnace blacks are preferred since they are more electrically conductive than channel blacks. The typical commercially available conductive carbon black has a very small particle size on the order of about 250A.

The substrate layer of the ribbons of the present invention are preferably from about 10 microns to about 30 microns in thickness. Best results are obtained at about 15 microns. When the layer is less than about 10 microns thick, it becomes too difficult to handle. On the other hand, when the substrate layer is thicker than about 30 microns, it requires too high a use of energy.

The following examples are given solely for purposes of illustration and are not to be considered limitations on the invention, many variations of which are possible without departing from the spirit or scope thereof.

EXAMPLE 1

6.6 gms. of polycarbonate resin (Mobay Corp., Merlon) was dissolved in 125 gms. of dichloromethane. Added to this mixture was 2.8 gms. of conductive carbon (XC-72 from Cabot Corp.). The mixture was dispersed in a 300ml plastic jar containing 200 gms. of 2mm diameter steel balls. Dispersion was completed by mixing on a Red Devil Paint shaker for 45 minutes.

The dispersion was dip coated onto 5 mil Mylar substrate to a dry thickness of 15 microns. (Mylar is a trademark of DuPont for polyethylene terephthalate.)

The resistive coating was then overcoated by a hot melt technique with a wax-based ink consisting of a blend of commercial waxes, carbon black, and methyl violet dye. Ink coating thickness was 5-6 microns with a melting point of 85° C. The resistive layer and ink layer was then delaminated from the Mylar belt for printing.

The ribbon was placed ink side against bond paper. A three mil tungsten electrode with connections to a power supply and a ground electrode was placed in contact with the ribbon back. An approximately 4 mil diameter spot was printed using 35 volts and 60 milliamps for one millisecond.

As a control experiment, a ribbon was fabricated in the same manner as above except the XC-72 conductive carbon was eliminated from the resistive layer. Dry thickness of resistive layer was 15 microns with a surface resistivity $> 10^{12}$ ohms/sq. Ink layer thickness was 5 to 7 microns. This ribbon was pulsed in the same print mode as above. No transfer of ink was observed.

EXAMPLE 2

A ribbon was fabricated in the same manner as Example 1, except the dry layer consisted of 47 percent polycarbonate, 20 percent conductive carbon, and 33 percent nickel powder (2 micron average particle size). The thickness of the layer was 19 microns and surface resistivity equalled 100 ohms/sq. Coated onto this layer was a waxy ink, such as described in Example 1, to a thickness of 5 to 7 microns. The ribbon was then delaminated from its Mylar support for printing purposes.

The ribbon was mounted against paper on a print robot which drum speed, voltage, and current could be controlled. Print was obtained at 10 inches/sec. using 18 volts and 80 milliamps.

EXAMPLE 3

In the same manner as Example 1, a ribbon was fabricated which in the dry state consisted of 80 percent polycarbonate and 20 percent conductive carbon. Dry thickness was 14 microns and surface resistivity was 810 ohms/sq. The ribbon was coated with a waxy ink and delaminated from the Mylar support for printing purposes.

The ribbon was mounted on the print robot in the manner described in Example 2. Print was obtained at 10 inches/sec. using 45 volts and 25 milliamps.

What is claimed is:

1. A ribbon for non-impact printing comprising a transfer layer and a substrate which is a polycarbonate resin containing from about 15% to about 40% by weight of elecrically conductive carbon black.

2. A ribbon as claimed in claim 1 wherein carbon black is present at about 30% by weight.

3. A ribbon as claimed in claim 1 wherein the substrate is from about 10 to about 30 microns in thickness.

4. A ribbon as claimed in claim 1 wherein the substrate is about 15 microns thick.

5. A ribbon as claimed in claim 1 wherein the transfer coating comprises wax, carbon black and a dye.

6. A ribbon for non-impact printing comprising a transfer layer and a substrate of about 15 microns thickness which is a polycarbonate resin containing about 30% by weight of electrically conductive carbon black.

* * * * *